United States Patent

Gibbons

[15] 3,674,812
[45] July 4, 1972

[54] HALOGENATED EPOXIDES
[72] Inventor: Carl L. Gibbons, Midland, Mich.
[73] Assignee: The Dow Chemical Company, Midland, Mich.
[22] Filed: Sept. 21, 1970
[21] Appl. No.: 74,205

[52] U.S. Cl.....................260/348 R, 260/30.4 R, 260/75 EP
[51] Int. Cl. ............................................................C07d 1/18
[58] Field of Search ................................................260/348 R

[56] References Cited

UNITED STATES PATENTS 3,590,009   6/1971   Gurgiolo et al.............................260/2

Primary Examiner—Norma S. Milestone
Attorney—Griswold & Burdick, Herbert D. Knudsen and C. E. Rehberg

[57] ABSTRACT

Trihaloneopentyl alcohol is reacted with epihalohydrin and then with base to give an adduct of the formula

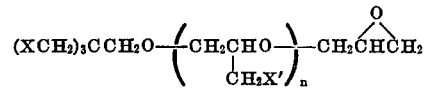

where each X and X' is independently Br or Cl and $n$ is an integer of 0 to about 10.

Such compounds are useful as plasticizers for polyvinyl chloride, as fire retardants for polyesters, and as intermediates.

7 Claims, No Drawings

HALOGENATED EPOXIDES

BACKGROUND OF THE INVENTION

Halogenated epoxides are well known in the art, especially those epoxides obtained from epichlorohydrin. The compounds of the present invention, however, are not known and their unusual properties could not have been predicted from the art.

Plasticizers for polyvinyl chloride have been continuously sought, especially those plasticizers which lend fire retardancy to polyvinyl chloride rather than deleteriously affect the fire retardancy of the resultant product. This search along with a search for a suitable fire retardant for polyesters has spurred research to find suitable compounds which have desirable properties to fulfill either of these needs.

Polyepihalohydrins have been employed as additives in acrylonitrile polymer along with other substances such as calcium phosphates and antimony oxide, see Lowes in U.S. Pat. Nos. 3,271,343 and 3,271,344. Such combinations gave films that were fire retardant.

SUMMARY OF THE INVENTION

According to the present invention, new halogenated epoxides of the general formula

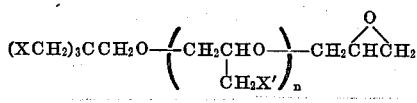

where each X and x' is independently Br or Cl and n is an integer of 0 to about 10 have been discovered. Such compounds are good plasticizers for polyvinyl chloride and are suitable fire retardants for polyesters.

The compounds contemplated by the invention are any of those which fit the general formula above. Preferred compounds of the invention are those wherein each X is Br and those compounds wherein each X' is Cl. Especially preferred are those compounds wherein each X is Br and each X' is Cl and those compounds wherein n is an integer of 0 to 5. Referring to specific compounds, those of special interest in the present invention have an $n$ of 0 and an $n$ of 1 respectively.

The compounds of the invention are prepared by reacting the appropriate bromo, chloro or bromochloroneopentyl alcohol with epichlorohydrin, epibromohydrin or mixtures thereof in the presence of a Lewis Acid catalyst as the first step. When this reaction is complete, the product is reacted in a second step with caustic or other suitable base to produce the terminal epoxide. Both reactions are well known and are conducted in the ordinary manner as exemplified in the Specific Embodiments.

The products of the invention are colorless high boiling liquids. Generally rather than obtaining one specific compound in the reaction, a mixture of compounds varying in the value of $n$ is obtained. The adducts of the present invention are freely soluble in many organic solvents such as acetone, methylene chloride, ethylene dichloride, chloroform, carbon tetrachloride, benzene, methanol and toluene.

The halogenated epoxides of the invention, especially those where $n$ is less than 5, are useful plasticizers for polyvinyl chloride to give a fire retardant product. They are also useful and compatible fire retardants for polyesters. These compounds are also especially useful intermediates for preparing ethers of compounds containing an active hydrogen such as polyglycols, and they may be hydrolyzed to give halogenated glycols.

SPECIFIC EMBODIMENTS

Example 1

To a reactor was charged 1,624 g. (5 moles) of tribromoneopentyl alcohol, 1,500 ml. of ethylene dichloride and 7.5 ml. of anhydrous stannic chloride. The reactor and contents were heated to 80° C. with stirring. 482 G. (5.2 m.) of epichlorohydrin was added dropwise with stirring over a period of 1 hour using the reaction exotherm to maintain the temperature at 82° to 85° C. At the termination of the addition of epichlorohydrin, the solution was stirred at 82° C. for 20 minutes. This solution was cooled to 70° C. and then treated with 10 moles of sodium hydroxide dissolved in 1,200 ml. of water. The 2 phase system was stirred vigorously at 75° C. for 40 hours. The organic phase was separated, washed with water until neutral and dried over magnesium sulfate. The product was stripped of solvent and by-products by vacuum distillation. The crude product was a pale yellow liquid weighing 1,240 g. The mixture was analyzed as described by Jay, in Analytical Chemistry 36, 667 (1964) to have an epoxy equivalent weight of 467 and by neutron activation analysis the product was analyzed to contain 53.6 percent by weight Br and 6.1 percent by weight Cl. The mixture in a differential thermal analysis showed exothermic decomposition at 330° to 345° C. In thermal gravimetric analysis where the sample is gradually heated, the mixture lost weight from 150° to b 325° C., with 50 percent weight loss at 250° C.

Example 2

A mixture of the product of Example 1 containing approximately equal weight percentages of and

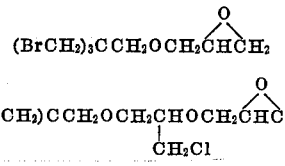

was blended with polyvinyl chloride sold under the trade designation PVC-2103 at a level of 90 parts per hundred of resin. The blending was done in a Brabender mixer at 150° C. for 5 minutes at a speed of 60 r.p.m. The material was then molded at a temperature of 150° C. and a pressure of 20,000 p.s.i. for 4 minutes. The final product was transparent and had a flexibility roughly equivalent to that obtained by plasticizing the same resin with 60 parts per hundred of dioctyl phthalate in the same manner. The finished product containing the halogenated epoxide exhibited a high degree of flame retardancy and was self-extinguishing when ignited with a match or a Bunsen burner flame. A sample of the product had a limiting oxygen index (IOI) as described in Combustion and Flame, 10, 135 (1966) of 0.400 as compared to an LOI of 0.225 for the product plasticized with a dioctyl phthalate.

Example 3

In the same manner as described by Example 2, a formulation containing 1 part by weight of the halogenated epoxide plasticizer of Example 1 and 1 part by weight of dioctyl phthalate was blended and molded with polyvinyl chloride as shown in Example 2 at a concentration of 60 parts per hundred to give a transparent material of slightly lower flexibility than the resin plasticized only with the dioctyl phthalate at the same level. This material was also self-extinguishing and had an LOI of 0.280.

Example 4

A polyester resin was prepared by reacting g. of maleic anhydride, 405 g. of phthalic anhydride, 320 g. of propylene glycol and 680 g. of the mixture of glycidyl ethers of tribromoneopentyl alcohol prepared in Example 1. The components described above were mixed and reacted at a temperature of 190° C. for 11 hours at atmospheric pressure. The product was diluted with 30 percent by weight of styrene monomer and cooked in the presence of 1 percent of benzoyl peroxide at a temperature of 180° F. to give a clear resin containing 15 percent by weight bromine. The polyester resin had an LOI of 0.247 and had physical properties similar to a polyester without the halogenated epoxide.

Example 5

In the same manner as shown in Example 1, two molar equivalents of epichlorohydrin was reacted with tribromoneopentyl alcohol to give a mixture of compounds of the general formula where each X was Br, each X' was Cl and n had an average value of about 1.2. This compound was tested as shown in Example 2 and found to be a suitable plasticizer for polyvinyl chloride.

Example 6

In the same manner as shown in Example 5, five molar equivalents of epichlorohydrin was reacted with tribromoneopentyl alcohol to give a product where the average value of $n$ was about 4. This mixture was tested as a plasticizer for polyvinyl chloride and found to give a flexible but stiffer product than that of Example 5.

In the same manner as described by Example 1 other compounds of the general formula are prepared by reacting tribromoneopentyl alcohol, trichloroneopentyl alcohol, or chlorobromoneopentyl alcohol with epichlorohydrin, epibromohydrin or mixture thereof in the presence of a Lewis Acid catalyst. Representative examples of such compounds include:

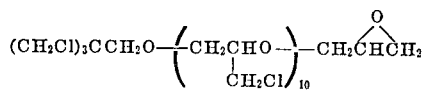

which is prepared by reacting trichloroneopentyl alcohol with about 11 moles of epichlorohydrin in the presence of stannic chloride and then reacting one mole of aqueous NaOH per mole of hydroxyl in the resultant product.

Other representative compounds include:

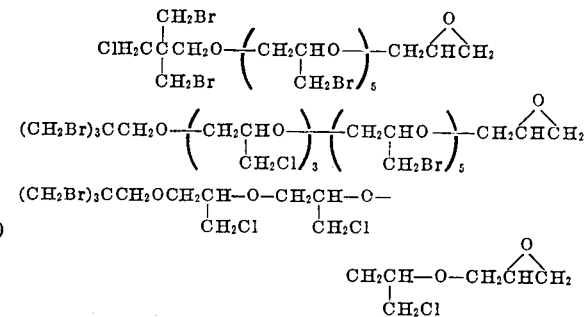

These compounds are suitable plasticizers, fire retardants and intermediates as described above.

I claim:

1. A compound of the formula

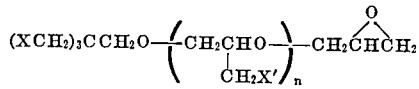

where each X and X' is independently Br or Cl and $n$ is an integer of 0 to about 10.

2. The compound of claim 1 wherein each X is Br.
3. The compound of claim 1 wherein each X' is Cl.
4. The compound of claim 1 wherein each X is Br and each X' is Cl.
5. The compound of claim 1 wherein $n$ is an integer of 0 to 5.
6. The compound of claim 1 wherein $n$ is 0.
7. The compound of claim 1 wherein $n$ is 1.

* * * * *